United States Patent [19]
Wing

[11] Patent Number: 5,256,014
[45] Date of Patent: Oct. 26, 1993

[54] NUT THREADED FASTENER FOR APPLYING A PREDETERMINED PRELOAD

[76] Inventor: George S. Wing, 531 Esplanade, Apt. 515, Redondo Beach, Calif. 90277

[21] Appl. No.: 822,779

[22] Filed: Jan. 21, 1992

Related U.S. Application Data

[63] Continuation of Ser. No. 546,533, Jun. 29, 1990, abandoned, which is a continuation of Ser. No. 225,649, Jul. 25, 1988, abandoned, which is a continuation of Ser. No. 846,302, Mar. 31, 1986, abandoned, which is a continuation-in-part of Ser. No. 702,811, Feb. 15, 1985, abandoned.

[51] Int. Cl.⁵ .................. F16B 31/00; F16B 19/00
[52] U.S. Cl. .................. 411/1; 411/360; 411/427; 411/937.2; 29/525.1
[58] Field of Search .................. 411/1-5, 411/8-10, 284, 333-336, 427, 429, 432, 402, 405, 281-283, 361, 360, 937.2; 29/446, 456, 525.1

[56] References Cited

U.S. PATENT DOCUMENTS

| | | | |
|---|---|---|---|
| 2,824,481 | 2/1958 | Johnson | 411/8 |
| 2,940,495 | 6/1960 | Wing | 411/305 |
| 3,741,266 | 6/1973 | Frailly | 411/281 |
| 3,763,725 | 10/1973 | Reiland | 411/2 |
| 3,842,878 | 10/1974 | Duer | 411/937.2 |
| 3,854,372 | 12/1974 | Gutshall | 411/402 |
| 3,929,054 | 12/1975 | Gutshall | 411/5 |
| 4,068,555 | 1/1978 | Volkman | 411/2 |
| 4,260,005 | 4/1981 | Stencel | 411/3 |
| 4,408,936 | 10/1983 | Williamson | 411/5 |
| 4,544,312 | 10/1985 | Stencel | 411/3 |
| 4,784,549 | 11/1988 | Wing | 411/1 |
| 4,858,299 | 8/1989 | Wing | 411/1 |

Primary Examiner—Neill R. Wilson
Attorney, Agent, or Firm—Christie, Parker & Hale

[57] ABSTRACT

Six lobes of a nut have axial surfaces falling on six tangent cylinders of equal radius and having axes lying on a right cylinder concentric with the axis of the nut. The surface of a second concentric right cylinder having a radius greater than the first defines furrows between the lobes. Successive lobes are tangent to an imaginary flat surface and the furrows are spaced away from the surface inside it.

23 Claims, 2 Drawing Sheets

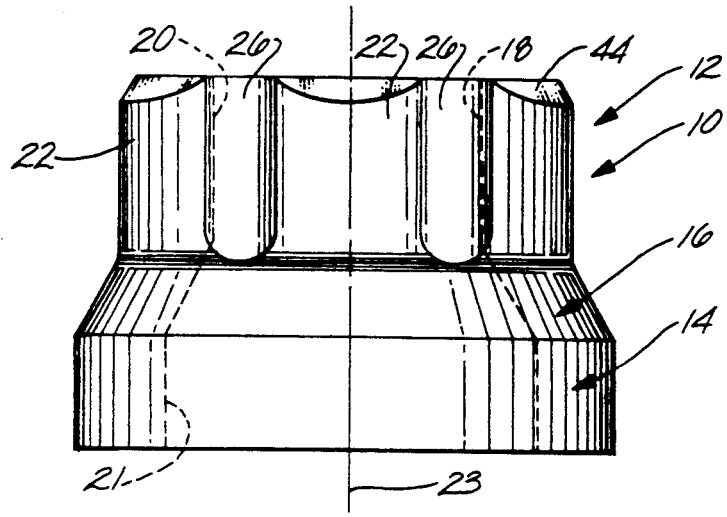
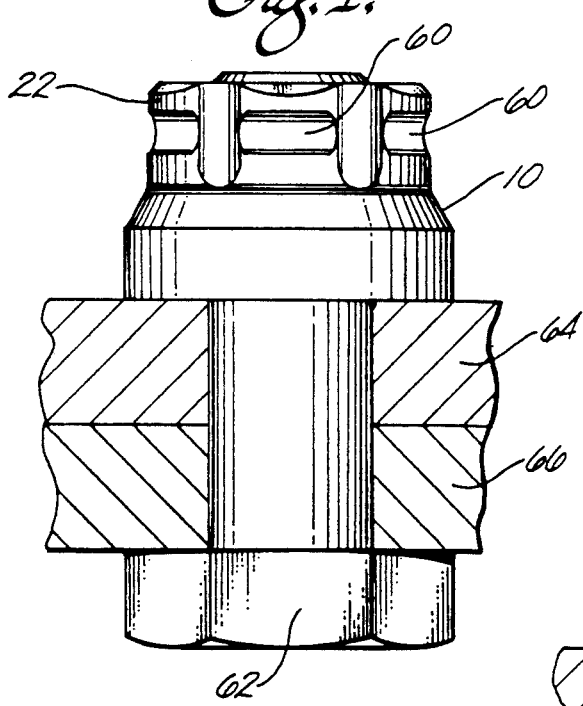
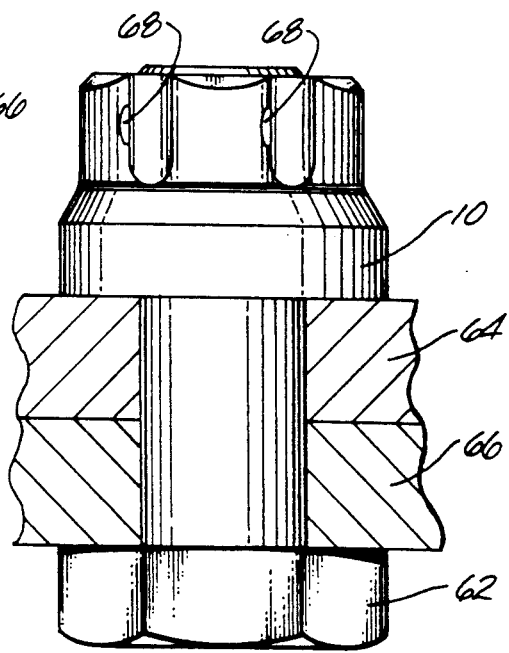

NUT THREADED FASTENER FOR APPLYING A PREDETERMINED PRELOAD

Cross-Reference to Related Application

This application is a continuation of U.S. patent application Ser. No. 07/546,533, filed Jun. 29, 1990, now abandoned, which is a continuation of U.S. patent application Ser. No. 07/225,649, filed Jul. 25, 1988, now abandoned, which is a continuation of U.S. patent application Ser. No. 06/846,302, filed Mar. 31, 1986, now abandoned, which is continuation-in-part of U.S. patent application Ser. No. 06/702,811, filed Feb. 15, 1985, now abandoned.

BACKGROUND OF THE INVENTION

The present invention relates to fasteners in general, and, more in particular, to female fasteners or nuts of the torque-limiting type.

In a standard threaded fastener system of a male threaded fastener and a female threaded fastener, the female fastener has internal threads that thread onto external threads of the male fastener. Wrenching surfaces of both fasteners accept tools that tighten them and clamp one or more workpieces together between them oftentimes with washers interposed in between. The combination of the fasteners and the workpieces are known as a "joint." Male threaded fasteners are variously known as "studs," "screws," "bolts," or "pins;" female threaded fasteners are variously known as "nuts" or "collars;" workpieces are sometimes called "sheets" or "structural elements."

Fasteners bear loads along their axes, tensile loads, and radially of the axes, shear loads. Tensile loading always exists because of the clamping force applied by the pin and the collar to the sheets; this load is known as "clamp-up" or "preload." When fasteners join two or more sheets and the sheets are loaded in their planes, one sheet may tend to slide over the other; when this loading of the sheets occurs, it is resisted by the fasteners, and the sheets load the fasteners in shear. Shear loads are transverse to the axes of the fasteners and transverse to the tension load. Cyclic loading of a fastener can produce fatigue failure. In aerospace applications fatigue failure is usually most critical in shear.

Adequate clamp-up or preload is absolutely necessary for a satisfactory joint A fastener adequately loaded by the reaction to the clamp-up load resists fatigue failure. Preload also helps the structural elements to resist fatigue failure. Accordingly, it is desirable to know the clamp-up load the fastener applies to a structure to be sure that a joint has adequate fatigue strength. Adequate clamp-up also avoids sheet slippage and fretting and insures against load shifting and joint failure.

Clamp-up load correlates to the resistance of a collar to further threading onto a pin and against a workpiece by the application of torque to the collar. As clamp-up force increases, the resistance to further threading increases, and the torque required to turn the collar increases.

This fact has been used in fasteners to develop a predetermined clamp-up load by termination of tightening through failure of a wrenching section on the collar. U.S. Pat. No. 2,940,495 to G. S. Wing and U.S. Pat. No. 4,260,005 to Edgar Stencel describe two types of such fasteners.

The Wing patent describes a collar extensively used in the aerospace industry. It has a wrenching section connected to an internally threaded section by a frangible breakneck collar. The collar breaks upon the application of a predetermined torque that corresponds to a desired clamp-up load. An acircular portion of the threaded section provides a thread lock by pressing tightly against the threads of the cooperating pin. A problem with this type of fastener is that it generates a waste piece: the wrenching section. The waste piece must be removed from the environment where the fastener is set. This type of fastener is also comparatively expensive because it requires a considerable amount of machining to make it, and the frangible breakneck must be held to very close tolerances to provide close tolerances in breakoff torques.

The Stencel patent describes a collar that has a plurality of circumferentially spaced lobes on its axial outside that serve as wrenching surfaces and in torque limitation. A wrenching tool, say a triangular shaped socket, has flats that engage flanks of the lobes and turn the collar with respect to the pin. Upon reaching a predetermined clamp-up load, the lobes fail in radial compression and merge into the body of the collar, and wrenching and tightening stops because the lobes no longer provide purchase for the setting tool. The Stencel collar produces a thread lock by a deformation of collar material radially inward of the lobes against the threads of a cooperating pin when the lobes fail.

Impact wrenches used in setting fasteners do so rapidly. The failures of the breakneck of the Wing fastener and of the lobes of the Stencel fastener occur over very few degrees of rotation, and, when an impact wrench is used, occur very rapidly. The rapid application of setting torques to a collar can result in loss of some desired preload through relaxation of the sheets; relaxation results from the continued deformation of the sheets after the initial loading. Sheet relaxation usually happens as a result of more than one fastener being necessary to pull all the parts together. Such deformation reduces the load per unit area and absolute loading because material moves away from the clamped zone. When the breakneck or the lobes fail, they fail at a torque corresponding to a desired preload. But the loaded sheets can relax and some of the preload lost. This relaxation is a time-dependent phenomenon, and with slower development of preload, relaxation and loss of preload will be less.

It may also be desirable to be able to change the preload even with the same collar. For example, when the sheets are not as strong in compression as some other sheets, it may be necessary to lower the compressive load on them.

In some applications secondary wrenching is desired in order to increase preload above design preload or to compensate for relaxation. Secondary wrenching is impossible in the standard configurations of the Wing and Stencel collars. These collars are also difficult to remove after they have been set because of the absence of wrenching sections.

In some applications because of space limitations straight-on wrenching is impossible and wrenching must be done from the side of the collar, say, with an open end wrench.

SUMMARY OF THE INVENTION

The present invention provides a female fastener that can be installed or removed with standard wrenches, say a hexagonal socket, or with a ball drive socket.

When driven with a ball drive socket, lobes of the collar fail upon reaching a predetermined preload by one or more balls of the driver plowing a furrow through them. A ball drive socket can also act against the lobes to tighten the collar to a predetermined preload and leave Brinnell marks as a signature that tightening the desired amount has occurred.

In one form, the present invention contemplates a female fastener or nut having internal threads and a plurality of axially extending lobes with arcuate external surfaces. These lobes provide wrenching purchase for either spherically curved wrenching elements or flat surfaced wrenching tools such as hexagonal sockets or end wrenches. Troughs between the lobes permit the spherically curved wrenching elements to bear on the flanks of the lobes.

The lobes lie within an imaginary regular geometric figure having straight sides, say a hexagon. Each side of the figure strikes a tangent to the surfaces of two successive lobes so that the lobes can accept a flat sided wrenching tool.

In a particular form, a right cylindrical surface concentric with the axis of the nut defines the surface of the troughs, the lobes extending radially outward from this surface at regular intervals. The lobes themselves have surfaces lying on tangent cylinders arrayed in a regular pattern with the axes of the cylinders lying on a second cylindrical surface concentric with the axis of the nut and having a radius smaller than the radius of the defining cylinder for the trough surfaces. Preferably, the nut has six lobes. It is also preferred that the nut have a base below the lobes with a counterbore for receiving imperfect thread convolutions of a male fastener, as is standard in many nuts or collars.

The lobed fastener of this invention accepts wrenching by either a flat sided wrench or a ball drive. The fastener can be re-wrenched and removed by wrenching. When driven with a ball drive, the fastener signs when it has been tightened the desired amount either by Brinnell marks or circumferential furrows.

These and other features, aspects, and advantages of the present invention will become more apparent from the following description, appended claims and drawings.

BRIEF DESCRIPTION OF THE FIGURES

FIG. 1 shows the preferred form of the nut of this invention in elevation;

FIG. 4 shows the nut of FIG. 1 in elevation set in a joint with circumferential furrows in its lobes; and FIG. 5 shows the nut of FIG. 1 in elevation set in a joint with Brinnell marks in its lobes.

DESCRIPTION OF THE PREFERRED EMBODIMENTS

Figure 2:
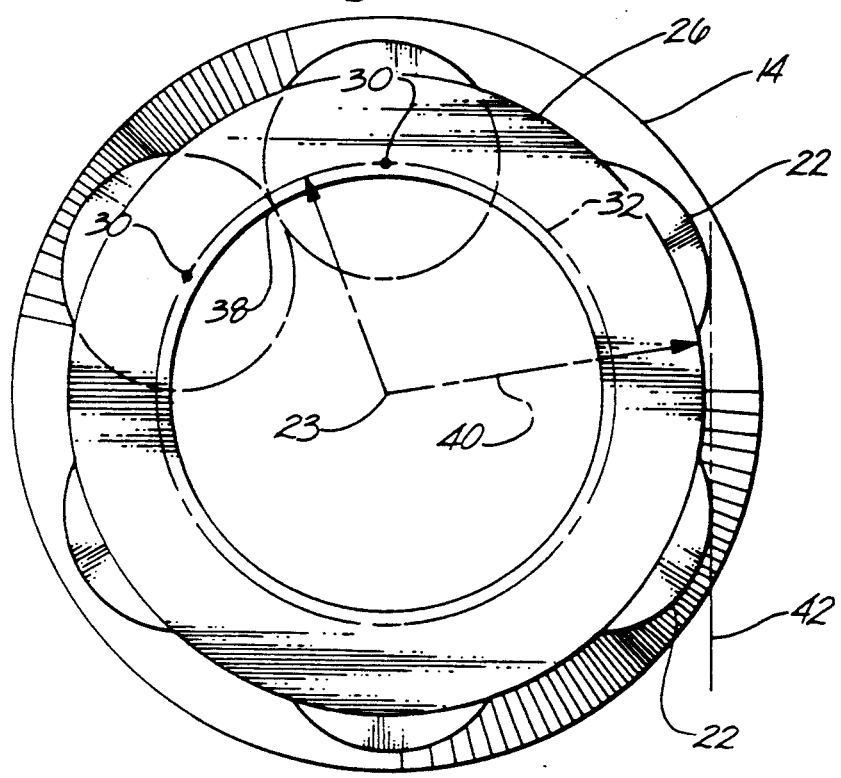
FIG. 2 shows the nut of FIG. 1 in top plan.

FIGS. 1 and 2 show the preferred form of a nut 10 made in accordance with the present invention. In general, the nut has a wrenching section 12, a base 14, and a transition section 16. An axial bore 18 through the nut has a threaded section 20 and a counterbore 21. The nut has an axis 23.

The wrenching section has a plurality of wrenching lobes 22 extending axially the length of the section. Each lobe has an arcuate, axially extending external surface. Troughs 26 extend axially the length of the wrenching section between adjacent lobes; the external surfaces or troughs 26 lie on a common right cylinder.

FIG. 2 shows best the geometry of the lobes and troughs. Lobes 22 have external cylindrical surfaces defined by the surfaces of tangent cylinders 28. These cylinders have parallel axes 30 that lie on a cylinder 32 that is concentric with axis 23 of the nut; axes 30 are also parallel to axis 23. An arrow 36 is the radius of cylinder 32. The tangency of cylinders 28 is shown at 38. All of the other lobes also have generating cylinders that have the same relationship as cylinders 28 to each other and to the nut.

Troughs 26 fall on the surface of a right cylinder having an axis concentric with axis 23 and having a radius 40. Radius 40 is larger than radius 36, and so troughs 26 meet cylinders 28 well out from cylinder axis 30 towards the outside of the nut.

A tangent line 42 between adjacent lobes is spaced radially from the surface of troughs 26. Line 42 represents the position of a wrenching surface against the lobes of a flat sided wrenching tool such as an end wrench.

The top of the lobe has a slight chamfer 44 to facilitate the insertion of a wrenching tool onto the nut.

Figure 3:
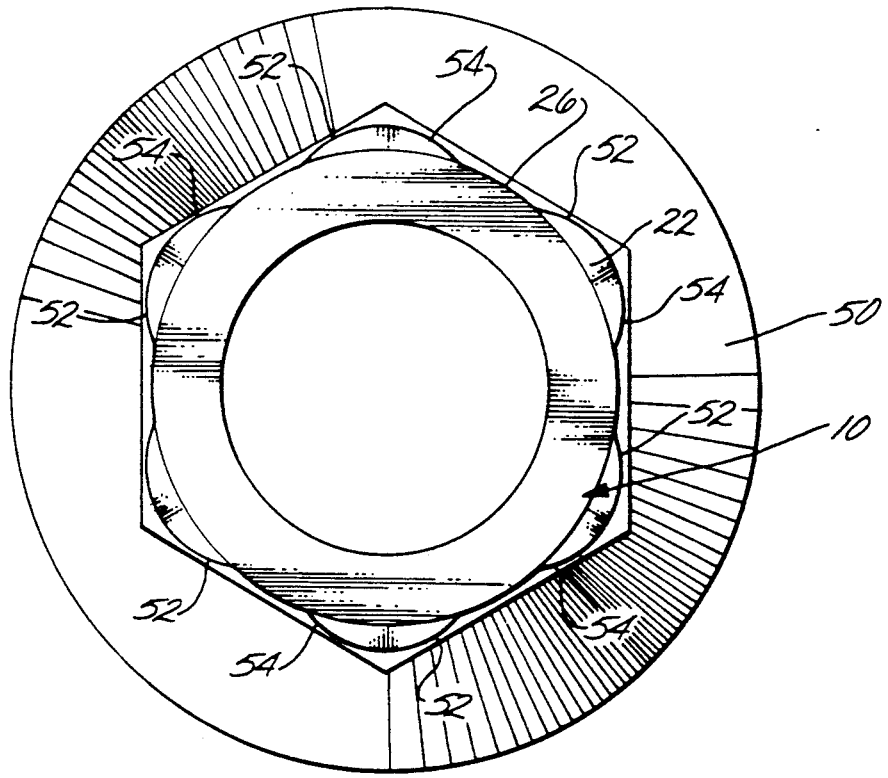
FIG. 3 shows the nut of FIG. 1 in top plan being wrenched by a flat side wrenching tool.

FIG. 3 shows nut 10 accepting a wrenching socket 50. The flats on the socket bear on the lobes about at tangency points 52 during tightening and at tangency points 54 during loosening. Troughs 26 lie on a cylinder inside of the wrenching surfaces of the socket and spaced from such surfaces.

When driven with a ball socket, the balls track on troughs 26 and bear against lobes 22. A suitable driver is shown in the parent to this application and a description of that driver is incorporated into this specification by reference. FIG. 4 shows a joint produced with a nut of the present invention and a circular driver that has plowed furrows 60 through lobes 22. The joint includes the nut, a bolt 62, and workpieces 64 and 66. The joint has a predetermined preload on it effected by a clamp-up force of nut 10 and the head of bolt 62 on sheets 64 and 66, respectively. This preload correlates with the failure of lobe material in circumferential compression by balls of the driver.

FIG. 5 shows a similar joint effected by a ball driver. However, instead of plowing furrow 60, the driver Brinnelled the lobes at 68 at a predetermined load. The Brinnelling represents the beginning of failure of the lobe, which if carried to completion would develop furrows 60. But Brinnelling 68 can correspond to a predetermined load. Brinnelling instead of furrows can result at the same preload that produces the furrows if the race diameter of the ball of the driver is smaller. Obviously, the preload with signature can be changed with appropriate changes in the race diameter of the drivers. The nut can be re-torqued to the same value with drive balls on a race of smaller diameter, and the furrow will deepen; this can be done again and again. The number of re-torquings can be determined by the drive sockets. This nut can also be re-torqued as necessary and with the re-torque new Brinnell marks added.

Brinnelling or the furrows sign the nut so that an inspector knows that it has been tightened a predetermined amount.

The present invention has been described with reference to certain preferred embodiments. The spirit and scope of the appended claims should not, however, necessarily be limited to the foregoing description.

I claim:

1. In a fastener having internal threads, an improvement in the means to wrench the fastener comprising:
a plurality of axially extending external lobes, each lobe having an external surface of arcuate curvature, the lobes being arranged in a pattern bounded by an imaginary regular geometric figure having straight sides with each side being tangent to the external surfaces of an adjacent pair of the lobes such that the lobes can accept a wrenching tool that has flat wrenching surfaces, the lobes having appropriate properties for failing in circumferential compression in response to the bearing of a spherically curved setting element at a first radius from the axis of the fastener to develop a circumferentially extending furrow through the lobes at a predetermined preload and for Brinelling the lobes in response to a spherically curved element at a smaller radius from the axis at the same preload and leaving a sufficient portion of the lobes for secondary wrenching; and
a trough between each of the lobes, each trough having a surface of radial dimension from the axis no more than any radial dimension from the axis to any of the arucate lobe surfaces and less than the minimum distance between a tangent to the surfaces of adjacent lobes and the axis of the fastener.

2. The improvement claimed in claim 1 wherein the troughs each have a surface that lies on a right cylinder having an axis concentric to the axis of the fastener and that has a radius less than the radius to any point on the arcuate surfaces of the lobes.

3. The improvement claimed in claim 2 wherein the arcuate surface of each lobe is a right cylindrical.

4. In a fastener having internal threads, an improvement in the means to wrench the fastener comprising:
a plurality of axially extending external lobes, each lobe having arcuate curvature, the lobes being arranged in a pattern bounded by an imaginary regular geometric figure having straight sides with each side being tangent to the surfaces of an associated pair of the lobes such that the lobes can accept a flat sided wrenching tool, the arcuate surfaces of the lobes being on tangent right cylinders of equal diameter, the lobes being adapted to fail in circumferential compression in response to bearing by a spherically curved setting element at a first radius to develop a circumferentially extending furrow through them at a predetermined preload and to Brinell the lobes at a smaller radius at the same preload; and
a trough between each of the lobes of radial dimension less than the radial dimension of any of the arcuate surface of the lobes.

5. The improvement claimed in claim 4 wherein the troughs are on a cylinder concentric with the axis of the thread.

6. The improvement claimed in claim 4 wherein there are six lobes.

7. The improvement claimed in claim 6 wherein the troughs are on a cylinder concentric with the axis of the thread.

8. In a nut having a base, a counterbore in the base, internal threads opening into the counterbore, a transition section adjacent the base, and a wrenching section adjacent the transition section, an improvement in the wrenching section comprising:
(a) a plurality of axially extending, circumferentially spaced apart external lobes, the external surface of each lobe lying on its own right cylinder of a radius equal to the radius of each of the other lobe right cylinders, each lobe right cylinder being tangent to its neighbors and all the lobe right cylinders having axes lying on a common right cylinder concentric to the axis of the collar;
(b) a trough between each adjacent pair of lobes, each trough lying on the surface of the same right cylinder concentric with the axis of the collar, the radius of the trough right cylinder being less than the radial distance from the axis of the collar to any point on the surface of the lobes but greater than the radius of the common right cylinder; and
(c) the lobes being adapted to fail in circumferential bearing upon the application of a predetermined load to them at a first radius by spherically curved setting elements to develop circumferentially extending furrows in the lobes and when the elements act at a smaller radius to Brinnell at the same load.

9. The nut claimed in claim 8 wherein there are six lobes.

10. A fastener comprising:
a fastener body;
six axially extending external lobes on the fastener body, each lobe having an external cylindrical surface with the same radius of curvature as each of the other lobes, the lobes being arranged in a hexagonal pattern bounded by an imaginary hexagon concentric with the axis of the fastener such that the lobes can accept a wrenching tool that has parallel wrenching surfaces, the lobes having appropriate properties for failing in circumferential compression in response to the bearing of a spherically curved setting element at a first radius from the axis of the fastener to develop a circumferentially extending furrow through the lobes at a predetermined preload and for Brinelling in response to the bearing of a spherically curved element at a smaller radius from the axis at the same preload; and
a trough between each of the lobes, each trough having a surface of radial dimension from the axis of the fastener no more than any radial dimension from the axis to any of the cylindrical lobe surfaces and less than the minimum distance between the axis of the fastener and the hexagon.

11. A fastener as recited in claim 10 wherein the cylindrical surface on each lobe is defined by a circle which is tangent to a circle on the axis of the fastener having the same diameter as the diameter of the surface-defining circles.

12. A fastener as recited in claim 10 wherein each trough surface lies on a right cylinder having an axis concentric to the axis of the fastener and a radius no more than the minimum distance between the axis of the fastener and the external surfaces of the lobes.

13. A fastener having an axis, a base, a counterbore in the base, internal threads in a bore opening into the counterbore, a transition section adjacent the base, and a wrenching section adjacent the transition section and comprising:
six axially extending, circumferentially spaced apart external lobes on the wrenching section, the external surface of each lobe lying on its own imaginary right cylinder having a radius equal to the radius of each of the other lobe right cylinders, each lobe right cylinder touching its neighbors and all the lobe right cylinders having axes lying on a first right cylinder concentric to the axis of the nut; and a trough between each adjacent pair of lobes, each trough lying on the surface of a second right cylinder concentric with the axis of the fastener, the radius of the second right cylinder being less than the radial distance from the axis of the fastener to any point on the surface of the lobes but greater than the radius of the first right cylinder and less than the minimum distance between a tangent to the surfaces of adjacent lobes and the axis; and wherein the lobes have appropriate properties for failing in circumferential bearing upon the application of a predetermined load to them at a first radius from the axis of the fastener by spherically curved setting elements to develop circumferentially extending furrows in the lobes and when the setting elements act at a smaller radius for Brinelling at the same load.

14. A method for setting a threaded fastener that has an axis, a plurality of axially extending lobes on the fastener, each lobe having an external surface of arcuate curvature, the lobes being arranged in a pattern bounded by an imaginary regular geometric figure concentric with the axis and having flat sides with each side being tangent to the surfaces of an associated pair of the lobes such that the lobes can accept flat sided wrenching tool, and a trough between each of the lobes of radial dimension no more than the minimum radial dimension of any of the arcuate surfaces of the lobes and less than the minimum distance from a tangent to the surfaces of adjacent lobes and the axis, the method comprising:

(a) tightening the fastener to a predetermined preload on a cooperating fastener and in a joint by applying circumferential compression to one of the lobes through at least one spherically curved setting element; and (b) terminating the tightening by failing the lobe in circumferential compression.

15. The method claimed in claim 14 wherein the lobe failure is by Brinelling the lobe with the setting element.

16. The method claimed in claim 15 wherein the fastener is retightened after the first tightening, the retightening being with a parallel sided wrenching tool acting on the lobes.

17. The method claimed in claim 16 wherein the fastener is retightened after the first tightening, the retightening being with a parallel sided wrenching tool acting on the lobes.

18. The method claimed in claim 14 wherein the lobe failure is by the setting element plowing a furrow through the lobe.

19. A method for forming a joint with a nut, a threaded male fastener and workpiece, the nut having an axis, a base, a counterbore in the base, internal threads opening into the counterbore, a transition section adjacent the base, and a wrenching section adjacent the transition section, the wrenching section having a plurality of axially extending, circumferentially spaced apart lobes, the external surface of each lobe lying on its own right cylinder of a radius equal to the radius of each of the other lobe right cylinders, each lobe right cylinder touching its neighbors and all the lobe right cylinders having axes lying on a first right cylinder concentric to the axis of the nut, a trough between each adjacent pair of lobes, each trough lying on the surface of a second right cylinder concentric with the axis of the nut, the radius of the second right cylinder being no more than the radial distance from the axis of the nut to any point on the surface of the lobes but greater than the radius of the first right cylinder, and less than the minimum distance from the tangent to the surfaces of an associated pair of lobes and the axis, the method comprising the steps of:

(a) tightening the nut to a predetermined preload on the male fastener in the forming of the joint by applying circumferential compression on at lease one of the lobes through at least one spherically curved setting element;

(b) failing the lobe in circumferential compression with the spherically curved setting element; and (c) terminating the tightening when the lobe fails in circumferential compression.

20. The method claimed in claim 19 wherein the lobe failure and the terminating of tightening are by the setting element plowing a furrow through the lobe.

21. The method claimed in claim 19 wherein in the lobe failure is by Brinelling the lobe with the setting elements.

22. The method claimed in claim 21 wherein the nut is retightened after the first tightening, the retightening being with a parallel sided wrenching tool acting on the lobes.

23. The method claimed in claim 22 wherein the nut is retightened after the first tightening, the retightening being with a parallel sided wrenching tool acting on the lobes.

* * * * *